C. I. E. MASTIN.
PISTON ROD PACKING AND THE METHOD OF MAKING SAME.
APPLICATION FILED MAY 9, 1913. RENEWED MAR. 16, 1914.
1,172,543.
Patented Feb. 22, 1916.
2 SHEETS—SHEET 2.
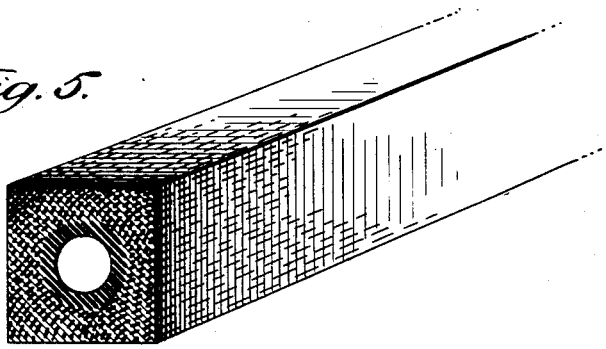
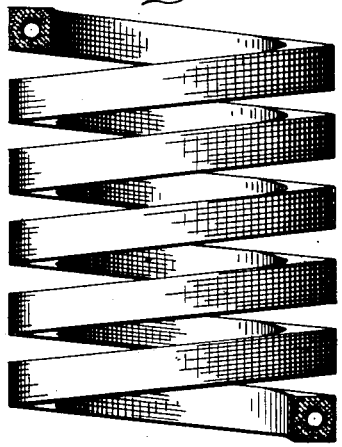
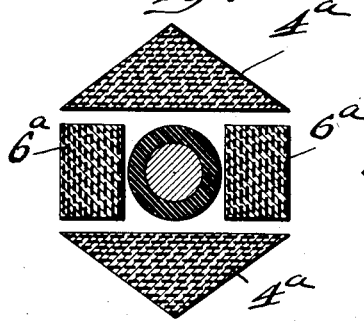
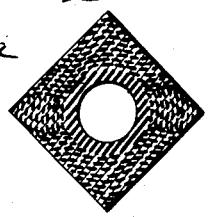
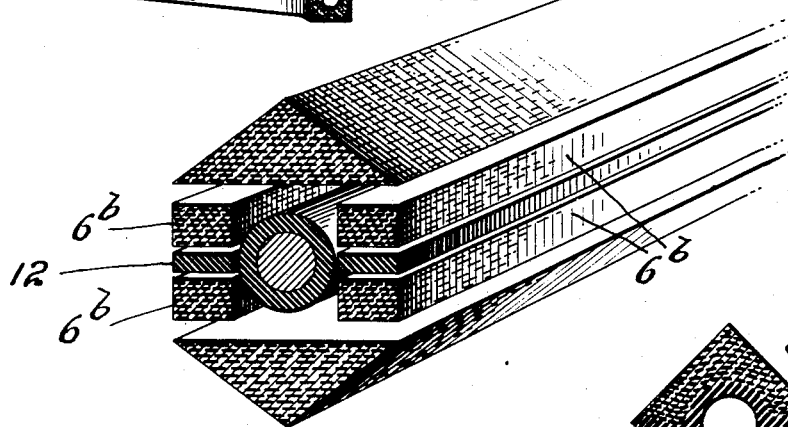
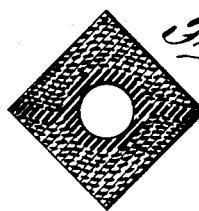
Witnesses:
Charles I. E. Mastin, Inventor
By his Attorneys

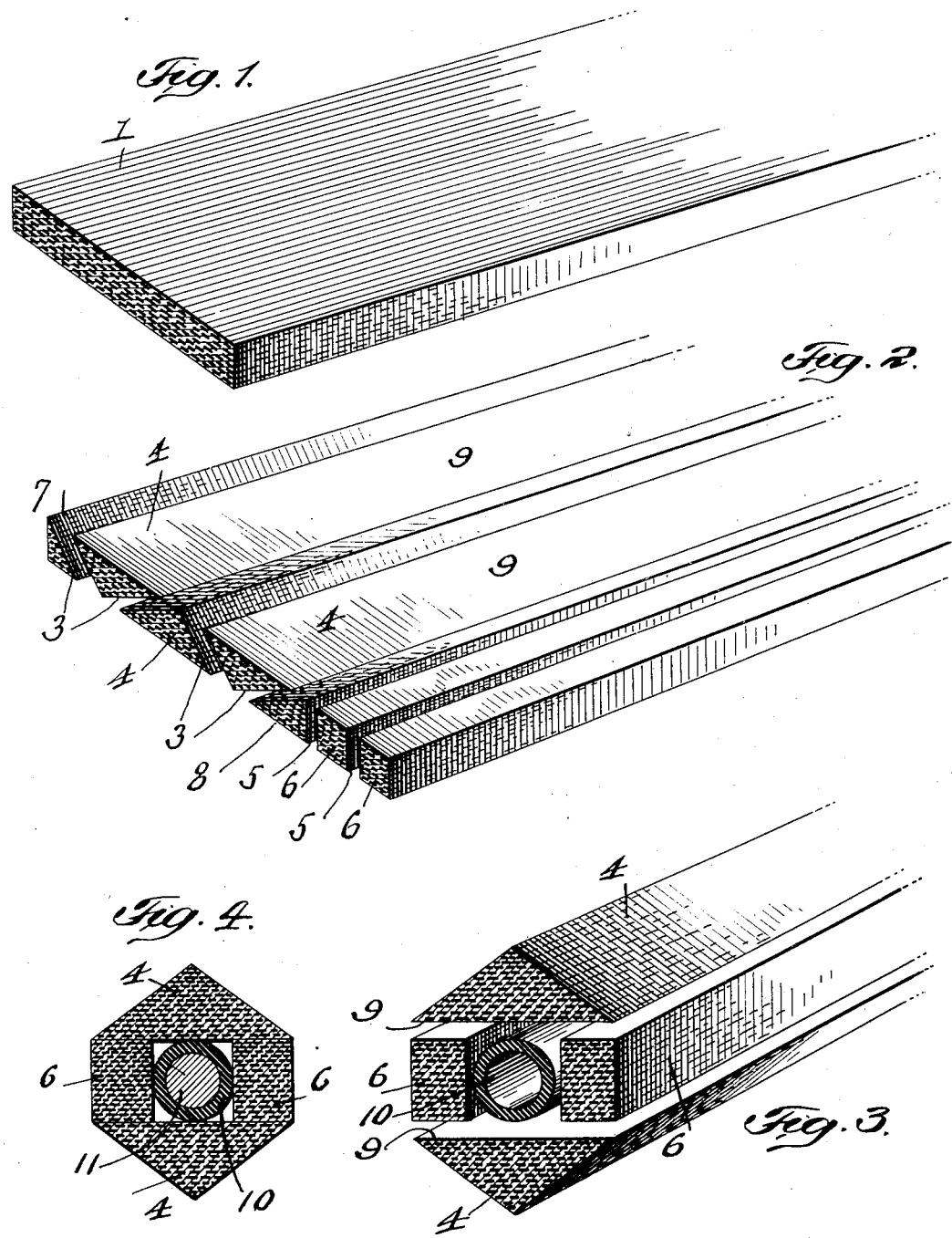
C. I. E. MASTIN.
PISTON ROD PACKING AND THE METHOD OF MAKING SAME.
APPLICATION FILED MAY 9, 1913. RENEWED MAR. 16, 1914.
1,172,543. Patented Feb. 22, 1916.

UNITED STATES PATENT OFFICE.

CHARLES I. E. MASTIN, OF MIDLAND PARK, NEW JERSEY.

PISTON-ROD PACKING AND THE METHOD OF MAKING SAME.

1,172,543.  Specification of Letters Patent.  Patented Feb. 22, 1916.

Application filed May 9, 1913, Serial No. 766,520.  Renewed March 16, 1914.  Serial No. 825,154.

*To all whom it may concern:*

Be it known that I, CHARLES I. E. MASTIN, a citizen of the United States, and resident of Midland Park, county of Bergen, State of New Jersey, have invented certain new and useful Improvements in Piston-Rod Packings and the Method of Making Same, of which the following is a specification.

The object of my invention is to provide a packing for piston rods and other moving parts of engines and machinery where a tight joint to prevent the passage of steam, air, oil or water is required; and to provide a new method of making said packing.

My invention further relates to improvements in that class of packings in which alternate layers of a fabric and rubber or other elastic compound are used, the whole being formed into a solid mass or one piece.

Another object of the invention is to form the packing strip of alternate layers of fabric and an elastic compound such as rubber and to compress the packing so that the fabric layers are contracted and reduced and made smaller than their normal dimensions so that when the packing is expanded through heat and the absorption of moisture the fabric layers will swell and extend themselves, and the rubber or other elastic material will yield in response to the enlargement or swelling of the fabric.

In packing heretofore made of layers of fabric and rubber the packing was expanded or extended laterally or sidewise by compression, but it is the purpose of my invention to provide a condensed packing which will have an unusually large expansion by absorption. The fabric will take up moisture and thereby swell and expand, the rubber or other elastic material yielding to this expansion and thereby permitting the enlargement of the packing when in service.

In a packing made up of fabric and rubber layers, where the fabric is in its normal condition in the packing, any expansion or lateral extension of the packing by compression must result in a distortion or stretching of the fabric. It is also clear that the expansion of such a packing is limited to the extensibility of the fabric layers. It is manifest, however, that a packing strip constructed in accordance with my invention is capable of a large expansion due to the condensed and compacted condition of the fabric. The fabric is condensed and compressed in order that it may have a large degree of expansion through absorption of the hot liquids.

By reason of the compression of the packing the fabric and rubber layers are curved and deflected within the packing strip, the various layers being thus interlocked and entwined and compressed together so that the absorption of liquids will take place slowly. It is well known that the hot oils in the stuffing boxes of an engine disintegrate the rubber of the packing strip. By compressing my packing and curing it in its compressed condition, thereby maintaining or fixing the fabric layers in their curled and swirled position, the penetration of the packing by the hot oils in the stuffing box is very greatly retarded. The result of this is that the rubber in the packing is not readily disintegrated and the life of the packing is thereby increased.

Another object of the invention is to so construct the packing that the edges of the fabric layers will be presented at the outer surfaces of the strip so that absorption will take place substantially equally on all sides.

Another object of the invention is to form a packing strip with a longitudinal aperture or hole whereby the packing will be more resilient and elastic and will yield to the minute lateral vibrations of the piston rod, when the packing is in service.

In the drawings, Figure 1 is a perspective view of a portion of a slab made up of layers of fabric and rubber; Fig. 2 is a similar view showing the method of cutting the slab to produce the strips from which the packing is formed; Fig. 3 shows the strips properly assembled for the formation of a packing strip; Fig. 4 a cross sectional view showing the various sections of the strip assembled about a rigid mandrel and in condition to be compressed and cured or vulcanized; Fig. 5 a sectional perspective view of the packing strip compressed and cured or vulcanized to form the permanent strip; Fig. 6 a detail view of a coil of packing, showing how the same is usually made up for sale; Fig. 7 a transverse sectional view showing a slightly modified arrangement of the strips before they are finally compressed and cured to form the packing; Fig. 8 a cross sectional view of the packing produced from parts arranged as shown in Fig. 7; Fig. 9 a sectional perspective view showing a further modification of the arrangement of the parts, the spacing strips being divided longitudinally and a heavy layer of rubber inserted between said divisions; and Fig. 10 shows the complete packing formed from the strips arranged as shown in Fig. 9.

In forming my packing I use a slab, as 1, of alternate layers of fabric such as comparatively loosely woven cotton duck, and rubber. I cut this slab on longitudinal lines as shown in Fig. 2, inclined cuts 3 being made on an angle of substantially 45° with respect to the flat face of the slab. This method of cutting the slab produces triangular pieces 4. I also make cuts 5 perpendicularly to the flat face of the slab to produce the substantially rectangular strips 6, the corner piece 7 and the cut-out strip 8 being brought together to form a triangular piece substantially like the pieces 4, so that none of the slab material need be wasted. In making up a packing strip two of the triangular pieces 4 are brought with their flat faces 9 toward each other and between said two pieces are arranged two of the rectangular pieces 6, one near each longitudinal edge of the broad flat face 9 of the strips 4. When the four strips of packing material are arranged, as described and as shown in Fig. 3, there is a central open space in the strip, and in this central space is placed a tube 10 of rubber. Through this rubber tube is inserted a rigid mandrel 11 of the proper dimensions and the parts are then brought into close contact with each other as shown in Fig. 4. A coating or layer of rubber or other suitable elastic material is arranged between the adjoining faces of the four strips of packing material so that when they are brought into close contact they adhere together and maintain themselves in proper relative position for the subsequent steps in the method of manufacture.

The strips 4 and 6 are made larger than the dimensions of the final completed strip and after they are arranged as shown in Fig. 4 the assembled strips with the rigid mandrel are placed in a suitable molding press and subjected to a high pressure and to a high temperature. When the parts thus assembled are placed in a mold which is rectangular in cross section and then compressed the resulting completed packing strip is shown in Fig. 5. This packing strip has been reduced in dimensions in all directions and the rectangular strips 6 have been absorbed within the rectangle and forced to take their positions at the corners of the packing strip. It will be noted that the layers of fabric and rubber which were straight and parallel in the original strips or sections have been materially distorted and curved and swirled about within the rectangular strip so that they are not parallel and are not straight but are curved in irregular manner and interlocked. It is also clear that by compacting the strip and contracting it by compression the fabric layers are reduced in dimensions and necessarily puckered or gathered within the rectangle of the completed strip. By subjecting the compressed and compacted strip to a high temperature it is cured or vulcanized in its compressed state. It will, of course, be understood that the curing or vulcanization is carried only to a point sufficient to maintain the strip in its compressed condition, but the degree of solidity or hardness of the packing may be considerably varied in the process of curing.

The rubber tube 10 is preferably rendered oil-proof by any means and seals the edges of the fabric layers which would otherwise be exposed around the wall of the longitudinal hole, said sealing tube preventing access of oil and moisture to the inner edges of the fabric. The hole formed longitudinally through the packing strip is for the purpose of rendering the strip more flexible and elastic or resilient. This hole permits the condensed packing strip to be readily coiled and also permits the packing to yield transversely to the lateral vibrations of the piston rod in service. This yielding is necessary in order to prevent an undue friction on the rod. It is manifest that if this packing did not yield transversely there would be a great friction on the piston rod with the result that the rod would be heated and the packing would be eventually burned. It is, therefore, manifest that this longitudinal hole is an important feature in my highly condensed and compressed packing.

When the packing strip has been compressed and cured it is preferably coiled, as shown in Fig. 6, said coiling being made permanent by any suitable means or method, the coiling being merely for the convenience of the user and enabling packing rings to be readily made.

In Fig. 7 the rectangular spacing strips 6$^a$ are arranged with the fabric and rubber layers at right angles or perpendicular to the layers in the triangular strip 4$^a$. The result of this arrangement is that in the completed packing strip the layers are swirled and interlocked in the manner shown in Fig. 8.

In Fig. 9 a further modification of the arrangement of the spacing strips is shown. In this arrangement the strips 6$^b$ are divided and heavy bands of rubber 12 are inserted between the sections thereof. The result of this arrangement of parts is shown in Fig. 10 wherein a heavy band of rubber extends diagonally across the completed packing strip forming a yieldable elastic division between the two triangular sections.

It is manifest from the foregoing that I provide a packing strip of rubber and fabric layers whose expansibility through absorption is very great. It is also manifest that the fabric layers are compacted and distorted within the packing strip in such manner that the absorption of hot oils and other liquids in the stuffing box by the fabric will be retarded and that consequently the rubber within the packing strip will be protected for a long time from the disintegrating effects of the hot oils.

It is also manifest that my invention is applicable to packing strips made up in various forms and shapes in transverse section; that it may be used in packing strips with or without the longitudinal opening or hole; and that it may be applied to packing strips having the layers of rubber and fabric running in any direction with respect to the wearing faces of the packing.

From the foregoing it will be understood that I provide a heavily condensed packing which is adapted to expand through the absorption of hot liquids in the stuffing box and which is not designed to be expanded by pressure from the stuffing box gland.

What I claim is:

1. A one-piece packing strip having a plurality of wearing faces and formed of alternate layers of fabric and rubber, the fabric layers being distorted from a regular line, whereby adjoining layers will be interlocked.

2. A one-piece packing strip having a plurality of wearing faces and formed of alternate layers of fabric and rubber, the fabric layers being distorted from a regular line, whereby adjoining layers will be interlocked, the packing strip being formed with a longitudinally extending aperture.

3. The process of manufacturing one-piece packing consisting in forming a slab of alternate layers of fabric and rubber, cutting sections from said slab, arranging said sections to form a packing strip larger in transverse dimensions than the completed strip, subjecting said arranged sections to pressure to reduce the dimensions of the strip and to heat to permanently unite all of said sections to form a homogeneous one-piece packing strip and to maintain the strip in its compressed condition and reduced dimensions.

4. The process of manufacturing one-piece packing consisting in initially forming a packing strip of alternate layers of fabric and rubber of larger cross sectional dimensions than the completed packing strip and then compressing said strip to reduce its cross sectional dimensions and subjecting it to heat while in its compressed condition to fix the strip in said compressed condition, whereby the completed strip will be of smaller cross sectional dimensions than the initially formed strip.

5. The process of manufacturing one-piece packing consisting in forming a slab of alternate layers of fabric and rubber, cutting from said slab triangular sections and rectangular sections, assembling two of said triangular sections and two of said rectangular sections to form a substantially hexagonal packing strip, placing said strip in a suitable mold, compressing it to reduce its cross sectional dimensions and then subjecting it to heat to permanently unite all of said sections to form a homogeneous one-piece packing strip and to fix it in its reduced dimensions.

6. The process of manufacturing one-piece packing consisting of forming a slab of alternate layers of fabric and rubber, cutting from said slab triangular sections and rectangular sections, assembling two triangular sections and two rectangular sections, the rectangular sections being placed between the triangular sections, placing a rubber tube and mandrel in the space formed by the triangular sections, subjecting the arranged sections and tube to pressure and heat to reduce the cross sectional dimensions of the section and bring it to the proper cross sectional shape and then subjecting it to heat to fix the strip in its compressed condition and proper shape and to vulcanize all of the parts into a homogeneous mass.

7. A packing strip formed of alternate layers of fabric and elastic material, the fabric layers being contracted within the packing strip.

8. A packing strip formed of alternate layers of fabric and elastic material, the fabric layers being contracted and distorted within the packing strip.

9. A one-piece packing strip formed of alternate layers of rubber and fabric, the fabric layers being compacted or compressed within the packing strip and held in their compacted or compressed condition by the rubber.

10. A packing strip formed of alternate layers of rubber and fabric, the fabric layers being interlocked transversely of the strip.

11. A packing strip formed of alternate layers of rubber and fabric, said fabric layers being compacted and distorted within the packing strip and held in their compacted or distorted condition by the rubber.

12. A one-piece packing strip of alternate layers of fabric and rubber, the fabric layers being permanently united with the rubber and distorted or diverted from a regular line transversely of the strip, whereby the rubber will normally hold the fabric layers in their distorted or diverted condition.

13. The process of manufacturing one-piece packing consisting in forming sections or strips of alternate layers of fabric and rubber, arranging said sections to form a packing strip larger in transverse dimensions than the completed strip, and subjecting said arranged sections to pressure to reduce the transverse dimensions of the strip and to heat to vulcanize or cure the strip and thereby permanently unite all of the sections to form a single piece and to maintain it in its compressed condition and reduced dimensions.

14. The process of manufacturing one-piece packing consisting in forming triangular sections and rectangular sections of material formed of alternate layers of fabric and rubber, assembling two of said triangular sections and two of said rectangular sections to form a substantially hexagonal packing strip, compressing said strip to reduce its cross-sectional dimensions and then subjecting it to heat to permanently unite all of said sections to form a single or one-piece packing strip and to fix it in its reduced dimensions.

15. The process of manufacturing packing consisting in initially forming a packing strip of alternate layers of fabric and rubber of larger cross-sectional dimensions than the completed packing strip, and then compressing said strip to reduce its cross-sectional dimensions and to compact the fabric layers and to cause them to be distorted or diverted from their original parallel position, and then subjecting the compressed strip to heat to fix said strip in its smaller cross-sectional dimensions and to maintain the fabric layers in their distorted or diverted positions.

16. The process of manufacturing packing consisting in forming sections of alternate layers of fabric and rubber, arranging said sections to form a packing strip larger in transverse dimensions than the completed strip, placing a rubber core between said sections, inserting a rigid mandrel through said core, and then subjecting said arranged sections and core to pressure to reduce the transverse dimensions of the strip and to heat to vulcanize the strip and thereby maintain it in its compressed position and reduced dimensions and to permanently unite the core to said sections.

In testimony whereof I hereunto affix my signature in the presence of two witnesses.

CHARLES I. E. MASTIN.

Witnesses:
LILLIAN McGUIRE,
F. R. MILLER.

Copies of this patent may be obtained for five cents each, by addressing the "Commissioner of Patents, Washington, D. C."